F. D. BOZARTH.
NUT LOCK.
APPLICATION FILED AUG. 23, 1909.
1,029,339.
Patented June 11, 1912.
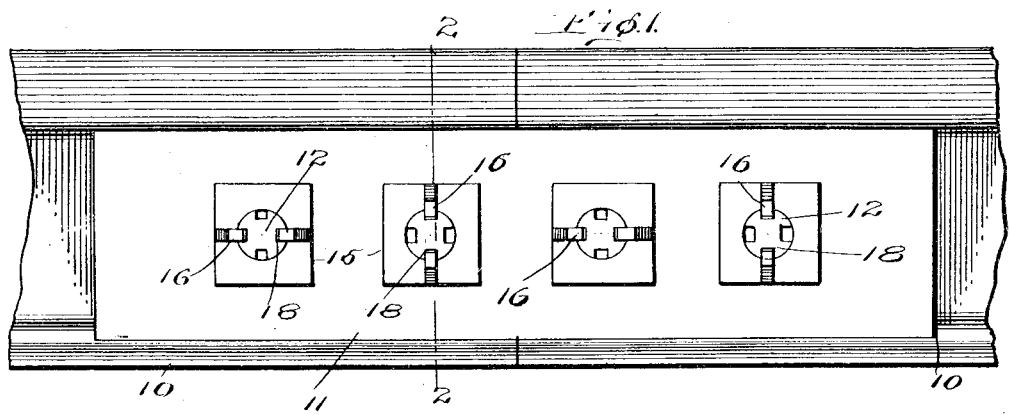
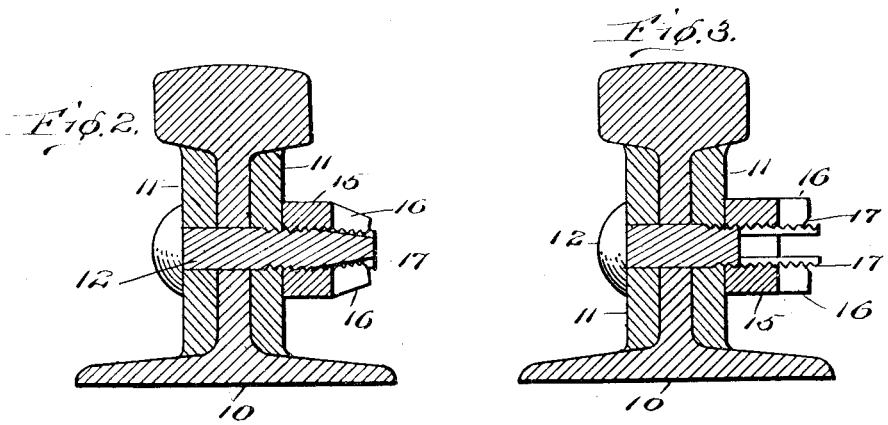
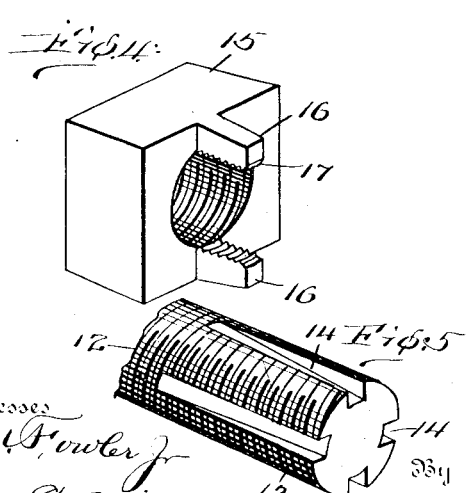
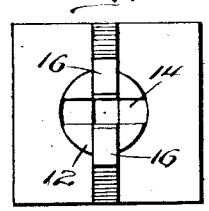
Inventor
Frank D. Bozarth.
Witnesses

UNITED STATES PATENT OFFICE.

FRANK D. BOZARTH, OF WILLIAMSBURG, VIRGINIA, ASSIGNOR OF ONE-HALF TO L. W. BROWN, OF BERKLEY, VIRGINIA.

NUT-LOCK.

1,029,339.  Specification of Letters Patent.  Patented June 11, 1912.

Application filed August 23, 1909. Serial No. 514,285.

*To all whom it may concern:*

Be it known that I, FRANK D. BOZARTH, a citizen of the United States, residing at Williamsburg, in the county of James City and State of Virginia, have invented certain new and useful Improvements in Nut-Locks; and I do hereby declare the following to be a full, clear, and exact description of the invention, such as will enable others skilled in the art to which it appertains to make and use the same.

This invention relates to nut locks, and has for an object to provide a lock of new and improved construction embodying features of reliability, economy and security.

A further object of the invention is to provide a threaded bolt having recesses formed in the threaded surface and a nut provided with an improved form of bendable tongue integral with the nut and adapted to be bent into the recesses in the threads.

With these and other objects in view, the invention comprises certain novel constructions, and combinations of parts, as will be hereinafter fully described and claimed.

In the drawings:—Figure 1 is a conventional view of a rail joint and fish plate with the improved bolt and nut lock associated therewith. Fig. 2 is a transverse sectional view taken on line 2—2 of Fig. 1. Fig. 3, is a transverse view similar to Fig. 2 except that the slots are formed entirely through the bolt instead of simply as key-ways and the bendable tongues are not bent into the recess. Fig. 4 is a perspective view of one of the nuts. Fig. 5 is a perspective view of the threaded end of the bolt. Fig. 6 is a perspective view of a slightly modified form of nut. Fig. 7 is a view in end elevation of a bolt and nut showing the bolt slightly modified.

Like characters of reference designate corresponding parts throughout the several views.

While the improved nut lock which forms the subject-matter of the present application is adapted to be associated with rails as 10 and fish plates as 11 it is to be understood that it is equally satisfactory for use in other ways, and is here shown in such relation only for illustration.

The bolt upon which the nut is employed is shown at 12 in approximately the usual and ordinary form threaded at one end as indicated at 13 and with longitudinal recesses formed in the sides of the bolt in any approved number. In the form as shown at Figs. 2 and 5 the recesses are formed as tapered key-ways 14 deeper at the end of the bolt and tapering to disappearance at a distance back from the end, it not being necessary to extend the key-way the entire length of the threads.

The nut employed as shown at 15 may be square as shown or of any shape ordinarily employed and is provided with integral upstanding tongues 16 shown at Fig. 4 as threaded on their inner side but such threading is only as a convenience in manufacture and is not believed to be necessary to the proper operation of the lock.

As shown particularly at Figs. 2, 3 and 4, the inner corner of each of the bendable tongues is chamfered as shown at 17 so that when the tongue is bent into the locking recess a V-shaped cavity is formed as at 18 in Fig. 1 into which a pointed or edge punch, nail or other article may be inserted to drive the bendable tongue outwardly to permit the removal of the nut.

Instead of forming the nut with the bendable tongues upstanding above the normal surface as shown at Fig. 4 the tongues as shown at 16 may be formed flush with the surface of the nut by sawing slits 19 through the surface of the nut proper and the tongues 16' are bent inwardly into engagement with the recesses of the bolt as described relative to the upstanding tongues 16.

Instead of forming the recesses as keyways shown at 14 in Fig. 5 they may also be formed as slots extending entirely through the bolt as at Fig. 3 and in this case the tongues 16 will be bent over into the slot and, of course, will not come into engagement with the bottom of the slot as is the case in the embodiment shown at Fig. 5. Also with the bolt constructed as shown at Fig. 7 to remove the nut a punch may be inserted against the inner side of the tongue 16 and by hammering the tongue will be bent outwardly.

The great advantage of the present structure is that the locking of the nut and bolt may be accomplished without any special tools for the purpose and by the ordinary unskilled laborer. In use in railroad track construction or repair, for instance, the nut will be screwed up until sufficiently tight upon the bolt and until the tongues 16 register with the recesses 14 when the section hand or laborer may seat the tongues in the recesses by the use of the spike-maul or hammer which he has in his hand or available and without the use of any punch or other tools. It will thus be seen that the device considered from the point of operation is thoroughly simple and one which can be used successfully by any person no matter how unskilled. Considered from the point of economy of manufacture the nut can be stamped or otherwise formed with the tongues 16 thereon at the time of manufacture and threaded in the usual and ordinary manner without much, if any, unusual expense, and the key-ways in the sides of the bolts may be formed exactly in the usual manner. After the nut has been removed by bending back the tongue 16 as described it may be again employed as the tongues are capable of being bent several times and still perform their function. In fact the nut may be used until the tongues become broken.

What I claim is:—

A nut lock comprising a threaded bolt having a longitudinal furrow formed therein transversely of the threads and with substantially radial sides, of a nut having a bendable tongue projecting outwardly from one side thereof, with one edge of said tongue registering with the bore of the nut and the opposite edge extending substantially from the edge of the nut and in position to be struck by a hammer to be driven into the furrow of the bolt.

In testimony whereof I affix my signature in presence of two witnesses.

FRANK D. BOZARTH.

Witnesses:
W. G. BRINKLEY,
C. HARRIS.